Patented Feb. 9, 1943

2,310,591

UNITED STATES PATENT OFFICE 2,310,591

REFRACTORY

John Charles McMullen, Niagara Falls, N. Y., assignor to The Carborundum Company, Niagara Falls, N. Y., a corporation of Delaware No Drawing. Application November 30, 1937, Serial No. 177,229

5 Claims. (Cl. 106—61)

This invention relates to refractories for use in furnace linings and other metallurgical applications, especially for use under basic or neutral operating conditions, such as in open hearth steel furnaces. More particularly it is concerned with cast fused refractories having improved resistance to spalling as well as increased resistance to attack by basic and neutral slags and atmosphere.

In the operation of steel furnaces it is well known that the upper limit of temperature at which the furnace can be operated depends largely upon the ability of the refractories used to withstand corrosion by the slags and atmospheres present as well as the resistance of the refractories to spalling or shock due to sudden temperature changes. The type of refractory which is used in lining steel furnaces below their roofs is usually either a bonded chromite or bonded magnesite composition or some mixture of the two. It has been the general belief that chromite constituted one of the best ingredients for service under basic conditions as can be seen by its extensive use in steel furnace refractories.

However, bonded refractories undergo fairly rapid disintegration due to the destruction of the bond used in their manufacture and do not withstand slag attack to the degree desired in metallurgical operations. For that reason I prefer to use refractories of the cast variety; in other words, refractories made by fusing the raw materials in a furnace and pouring the molten materials into molds of suitable shape and properly annealing the cast pieces. The general procedure which I use is given in detail in U. S. Patent No. 2,063,154, of which I am a co-inventor.

One of the chief objections to the use of magnesite and chromite as refractory materials is their high cost. Much of the high grade magnesite is imported and necessarily is costly, and although domestic chromite is available its cost is comparatively high. To avoid the use of these costly materials and at the same time have a basic refractory containing substantial amounts of magnesium oxide to promote refractoriness under basic operating conditions, dolomite has found considerable use in open hearth steel furnace bottoms. The use of calcined dolomite has, however, encountered the objectionable handicap that refractory bodies containing calcined calcium oxide, one of the prime constituents resulting from calcination of dolomite, have hitherto been found very subject to attack by the moisture of the air, a characteristic known as slaking and for this reason calcined calcium oxide or dolomite after calcination have not been used widely as refractory materials despite their high refractoriness and basic character.

In addition to the objection due to cost, magnesium oxide or magnesite is objected to because of its high freezing point. This high freezing point makes it practically impossible to melt and pour the material in molten form to make solid cast blocks according to the procedure commonly used in making articles of various other cast materials.

Because of the above objections to magnesite as a refractory material, chromite has been used to a large extent in steel furnace linings and other metallurgical applications. However, this use of chromite in basic refractories has the further disadvantage that practically all chromite ores contain liberal amounts of silica as an impurity, and inasmuch as silica is an acid oxide, its presence in appreciable amounts is detrimental in that it lowers the resistance of the resulting refractory body to basic corrosive elements.

I have found that basic refractories possessing high resistance to slag attack and spalling may be made by fusing a mass of magnesia, lime, alumina and iron oxide. I have further discovered that by fusing magnesia and lime with either alumina or iron oxide the resulting refractory product is not attacked by the moisture in the air and is substantially a non-slaking material, even when it contains a large percentage of lime. In making fusions of the above oxides it is found desirable that the raw materials used contain little or no silica, which, if present, has a detrimental effect upon the product. It is not necessary to use straight or pure oxides in making up the fusion, but any raw materials may be proportioned to obtain the desired final composition providing they contain no considerable amount of silica. A cheap source of magnesia and lime is dolomite, which is readily available in large quantities. In this way the use of expensive high grade magnesite is avoided and gives the present product an economic advantage.

Fused combinations of the oxides of magnesium and calcium to form basic refractories without either alumina or iron have little value due to their tendency to slake upon standing. I have found that if iron oxide or alumina in proper proportions is added to fused combinations of calcium oxide and magnesium oxide, this property of slaking is practically eliminated, in addition to the improvement in other properties particularly resistance of the refractory to heat shock. Either or both alumina and iron oxide may be used to achieve this purpose; that is, the prevention of slaking when mixed with fused lime-magnesia mixtures to form refractory articles. Either may be used alone or combinations of the two. The resulting compositions not only retain the high degree of basicity possessed by straight magnesia, but are comparatively easily fused and cast into refractory shapes.

I have found that magnesia-lime refractories containing either alumina or iron oxide within the following limits possess improved resistance to heat shock or attack by basic slags over other basic refractory compositions as well as having no appreciable slaking tendency and at the same time are considerably less expensive in material cost.

| 1 | 2 |
|---|---|
| Per cent | Per cent |
| Magnesia 15-50 | Magnesia 15-40 |
| Lime 10-70 | Lime 50-80 |
| Alumina 5-40 | Iron oxide 5-20 |

I have found that mixtures within the above composition range are quite suitable in forming basic refractory bodies, and offer the following typical mixes which indicate the sorts of raw materials used. These mixes have been found to be good in basic refractory service and show substantial improvement over other common basic refractories in resistance to spalling and slag attacked and other refractory properties. In the mixes dolomite may be used as a source of lime and magnesia and additional oxides added as need be to give the compositions shown.

| 1 | 2 | 3 |
|---|---|---|
| Per cent | Per cent | Per cent |
| Magnesia 37 | Magnesia 30 | Magnesia 43 |
| Lime 52 | Lime 40 | Dolomite 17 |
| Iron oxide 11 | Alumina 30 | Alumina 40 |

Although the above examples show the use of iron oxide or alumina individually, it is to be understood that both iron oxide and alumina can be used jointly. In selecting raw materials for making up the above mixes I have found it essential for best results to choose materials which yield not over 5%, and preferably less, of silica in the final product as an impurity. The presence of silica in any appreciable amount tends to lower the resistance to slag attack and increases the tendency to spall and slake.

Tests made in the laboratory indicate clearly the reasons for the marked success of these cast refractories in furnace service. They show for example that cast refractories of the above described compositions are much more resistant to heat shock or spalling than are cast refractory articles of other materials. In addition to this remarkable improvement in spall resistance these refractories have been found to be unusually slag resistant as well as capable of withstanding extremely high temperatures. They moreover undergo practically no slaking action in moist atmospheres in spite of the fact that they contain large amounts of calcium oxide in a fused state.

While I have shown my preference for cast refractory shapes, I wish to point out that the above fused and crushed compositions also have improved properties when used to make bonded refractories using the standard methods of bonding technique well known to the ceramic trade. I therefore do not wish to be limited to the cast form of the specific mixes hereinabove disclosed but desire protection within the extent of the following claims.

I claim:
1. A fused cast refractory article composed of 15 to 40% magnesia, 50 to 80% lime and 5 to 20% iron oxide.
2. A fused cast refractory article composed of 15 to 50% magnesia, 10 to 70% lime and 5 to 40% alumina.
3. A fused cast refractory article composed of 15 to 40% magnesia, 30 to 70% lime and 5 to 40% iron oxide and alumina.
4. A basic, spall-resistant fused cast refractory article composed of approximately 30% magnesia, 40% lime and 30% alumina.
5. A basic, spall-resistant fused cast refractory article composed of approximately 37% magnesia, 52% lime, and 11% iron oxide.

JOHN CHARLES McMULLEN.